United States Patent [19]

Yost

[11] 4,418,107

[45] Nov. 29, 1983

[54] COVER FOR CARBON BAKE PIT

[75] Inventor: Richard J. Yost, Medford Lakes, N.J.

[73] Assignee: Combustion Engineering, Inc., Windsor, Conn.

[21] Appl. No.: 380,199

[22] Filed: May 20, 1982

[51] Int. Cl.[3] .......... F27D 1/18; B32B 3/24

[52] U.S. Cl. .......... 428/138; 428/137; 428/135; 428/256; 428/280; 432/237; 432/250; 373/122; 373/137

[58] Field of Search .......... 373/137, 122; 432/237, 432/242, 249, 250; 428/256, 285, 294, 135, 136, 138, 137, 280

[56] References Cited

U.S. PATENT DOCUMENTS

| | | | |
|---|---|---|---|
| 4,088,825 | 5/1978 | Carr | 373/137 X |
| 4,120,641 | 10/1978 | Myles | 432/250 X |

*Primary Examiner*—Alexander S. Thomas

*Attorney, Agent, or Firm*—Richard H. Berneike

[57] ABSTRACT

A flexible cover for a carbon bake pit has a flexible, expanded metal backing to which is attached a blanket of insulating ceramic fibers. This construction allows the cover to flex in order to conform to the surface of the material in the pit. Lifting means are attached to the expanded metal backing in a manner so as to permit this flexibility.

3 Claims, 5 Drawing Figures

COVER FOR CARBON BAKE PIT

BACKGROUND OF THE INVENTION

Carbon products of many types find commercial application with the largest quantities consisting of electrodes of various sizes and shapes. In manufacture, these carbon products and particular the electrodes are subjected to relatively high temperature heat treatment in order to provide the required mechanical strength and stability at high temperatures. The heat treatment also imparts the most desirable degree of electrical conductivity.

Most of these carbon products are baked in what are referred to as "carbon bake pits". These pits are formed with refractroy walls having channels and baffles through which the hot gases pass. The heat is conducted from the hot gases through the refractory walls to the carbon shapes which are embedded in green or calcined petroleum coke or a mixture of pulverized coke and silica sand. Some furnaces are electrically heated.

Whatever the heating system used, it is advantageous to provide insulation on top of the coke bed in the pit in order to reduce heat loss and fuel consumption and to ensure the proper temperature within the bed. Since the bed is formed by merely piling the coke over the carbon product to be heated, the surface of the bed is usually relatively uneven. For this reason, covers which are rigid have proved to be less than satisfactory.

SUMMARY OF THE INVENTION

The present invention involves a flexible cover for a carbon bake pit. More specifically, the invention involves a flexible, expanded metal backing to which is attached a blanket of insulating ceramic fibers, whereby the cover will flex in order to conform to the surface of the material in the pit. A further feature of the invention is lifting means which will not interfere with the flexibility of the cover.

DESCRIPTION OF THE PREFERRED EMBODIMENT

Figure 1:
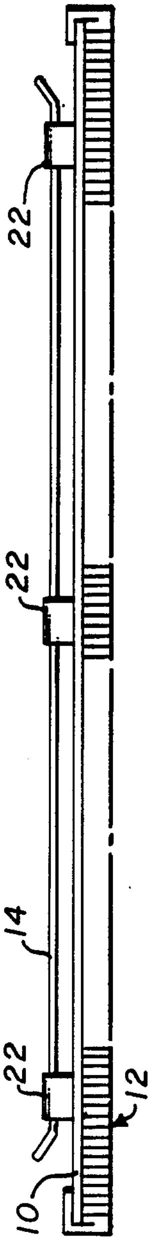
FIG. 1 is a side view of the cover of the present invention.

FIG. 1, which is a side view of the cover of the present invention, illustrates the expanded metal backing 10, the ceramic fiber layer 12 attached thereto and the lifting handle 14. Expanded metal, which is a commercially available product, is sheet metal which has rows of closely spaced slits cut therein after which the sheet metal is pulled outwardly or expanded in the direction perpendicular to the slits. The slits then form openings such as shown in FIG. 4.

Figure 2:
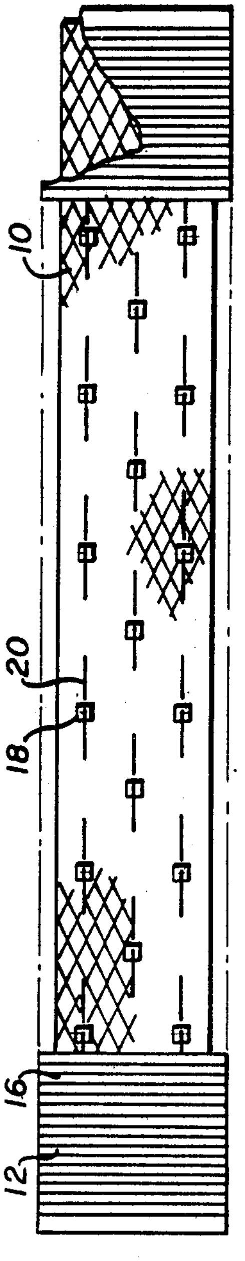
FIG. 2 is a bottom view of the cover of the present invention.
Figure 3:
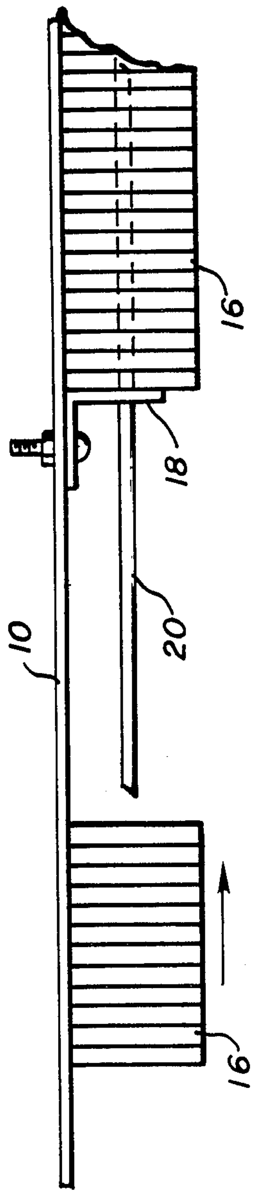
FIG. 3 is an illustration of the manner in which the ceramic fiber modules are attached.

As can be seen in FIG. 1, the ceramic fiber insulation 12 comprises a series of strips 16 of a ceramic fiber blanket material placed on edge and attached as shown in FIGS. 2 and 3. The attaching means comprises a series of L-shaped brackets 18 bolted or otherwise attached to the expanded metal. A suggested arrangement of these brackets is shown in FIG. 2. A group of the ceramic fiber strips is placed in position on one side of the bracket 18. A rod 20 is then inserted through a hole in the bracket 18 and through the ceramic fiber strips for one-half the length of the rod 20. The rod 20 may be pointed for ease of insertion. The next group of ceramic fiber strips are then inserted onto the other half of the rod 20 as shown in FIG. 3. This process is continued for the entire length of the cover. It should be noted that the width of the ceramic fiber strips is greater than the width of the expanded metal backing so that a tight fit of the cover into the pit is possible and so as to protect the expanded metal backing. At the ends of the cover, the ceramic fiber is folded back around onto the top of the expanded metal backing and pinned in place so as to properly protect these ends.

Figure 4:
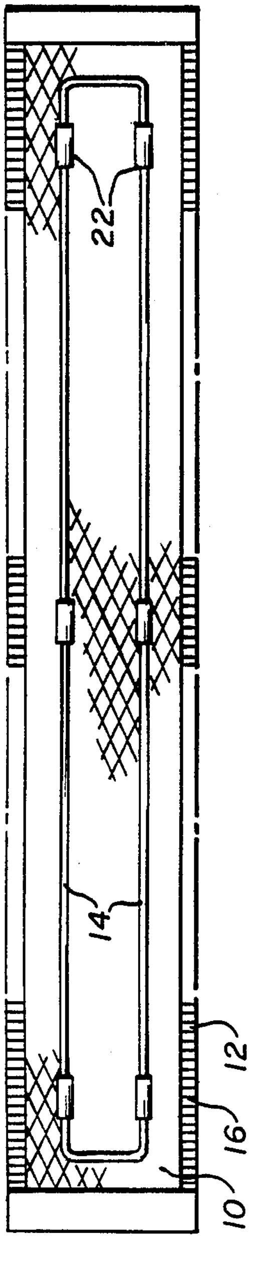
FIG. 4 is a top view of the cover of the present invention.
Figure 5:
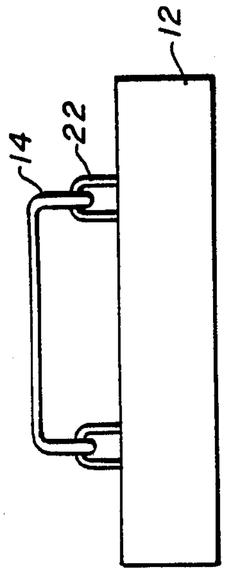
FIG. 5 is an end view of the cover of the present invention.

The handle 14 is attached to the expanded metal as shown in FIGS. 1, 4 and 5. The attaching means comprises loops 22 which are attached to the expanded metal. The handle 14 extends through these loops 22. The vertical height of the loops 22 provides sufficient clearance to allow up and down movement of the cover with respect to the handle so that the cover may bend and conform to the irregularities in the surface of the coke in the pit. Since expanded metal has one direction in which it is generally flexible while it is generally rigid in the direction perpendicular thereto, the expanded metal is laid out so that the flexible direction extends the length of the cover rather than the width. This provides the desired flexibility along the length of the pit in which the greatest variation in the surface would be expected.

I claim:

1. A flexible insulated rectangular cover comprising:

(a) an expanded metal backing having the generally flexible direction of said expanded metal running in the direction of the long dimension of said rectangular cover and the generally rigid direction running in the short direction of said rectangular cover;

(b) a flexible layer of ceramic fiber insulation adjacent one surface of said expanded metal backing;

(c) first attaching means attaching said layer of ceramic fiber insulation to said expanded metal backing, said first attaching means adapted to permit said expanded metal backing and said attached layer of ceramic fiber insulation to flex in the said flexible direction;

(d) a generally rigid elongated handle means extending in the direction of the long dimension of said rectangular cover and substantially the length thereof; and (e) second attaching means attaching said handle means to the other surface of said expanded metal backing, said second attaching means adapted to permit flexing of said expanded metal backing and said ceramic fiber insulation in said flexible long dimension independent of said generally rigid elongated handle means.

2. A flexible insulated rectangular cover as recited in claim 1 wherein said flexible layer of ceramic fiber insulation comprises a plurality of strips of ceramic fiber blanket, said strips being oriented face to face with respect to each other and on edge with respect to said expanded metal backing and running in said short direction.

3. A flexible insulated rectangular cover as recited in claim 1 wherein said second attaching means comprises loops attached to said expanded metal backing, said rigid elongated handle means extending through said loops and movable therein toward and away from said expanded metal backing.

* * * * *